United States Patent Office 3,446,735
Patented May 27, 1969

3,446,735
LUBRICANTS CONTAINING MOLYBDENUM PHOSPHORODITHIOATES
Herbert F. Wiese, Cleveland, Ohio, assignor to The Lubrizol Corporation, Wickliffe, Ohio, a corporation of Ohio
No Drawing. Original application July 30, 1962, Ser. No. 213,115, now Patent No. 3,402,188, dated Sept. 17, 1968. Divided and this application Nov. 22, 1967, Ser. No. 708,455
Int. Cl. C10m 1/48, 3/42; C10l 1/26
U.S. Cl. 252—32.7                            3 Claims

ABSTRACT OF THE DISCLOSURE

Molybdenum oxy salts of phosphorus acids, especially phosphorodithioic acids, are prepared by reacting the acid or an alkali metal salt thereof with an alkali metal or ammonium molybdate. The products are useful as oxidation and corrosion inhibitors in lubricants.

---

This application is a division of copending application Ser. No. 213,115, filed July 30, 1962, and now Patent No. 3,402,188.

This invention relates to metal salts of organic phosphorus acids and in a more particular sense it relates to molybdenum salts of organic phosphorus acids.

Metal salts of organic phosphorus acids are useful in a wide variety of applications. They are useful as emulsifying agents, detergents, plasticizers, paint driers, corrosion inhibiting agents, anti-wear agents, oxidation inhibiting agents, anti-foam agents, etc. Those which are soluble in hydrocarbon compositions have found use as additives in gasolines, fuel oils, lubricating oils and greases, cutting oils, transformer oils, hydraulic fluids, and other power transmitting fluids. In many such applications, the metallic constituent of the additives plays an important role in determining their effectiveness and utility. Accordingly, it is a principal object of this invention to provide molybdenum salts of organic phosphorus acids.

It is also an object of this invention to provide molybdenum salts of organic phosphorus acids which are especially suitable for use in hydrocarbon compositions.

It is also an object of this invention to provide methods for preparing molybdenum salts of organic phosphorus acids.

It is further an object of this invention to provide novel compositions of matter.

It is further an object of this invention to provide additives for use in lubricating compositions.

It is still further an object of this invention to provide lubricating compositions.

These and other objects are attained in accordance with this invention by providing a molybdenum salt of an organic phosphorus acid having the structural formula

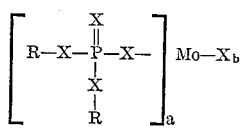

wherein R is a subtsantially hydrocarbon radical, X is selected from the class consisting of sulfur and oxygen, $a$ and $b$ are each an integer, and $(a+2b)$ is the valence of molybdenum from 4 to 8.

For the sake of convenience, the above molybdenum salts are referred to as phosphoryl-substituted molybdenum axides or sulfides in which the phosphoryl radicals are derived from the di-esterified phosphoric acids and their thio-analogues such as phosphoromonothioic acids, phosphorodithioic acids, phosphorotrithioic acids, and phosphorotetrathioic acids. The molybdenum in the salts may be tetra-, penta-, hexa-, hepta, or octa-valent. Its valency is satisfied in the above formula by the bi-valent X radical and the mono-valent phosphoryl radical. Thus, the salts include, e.g.,

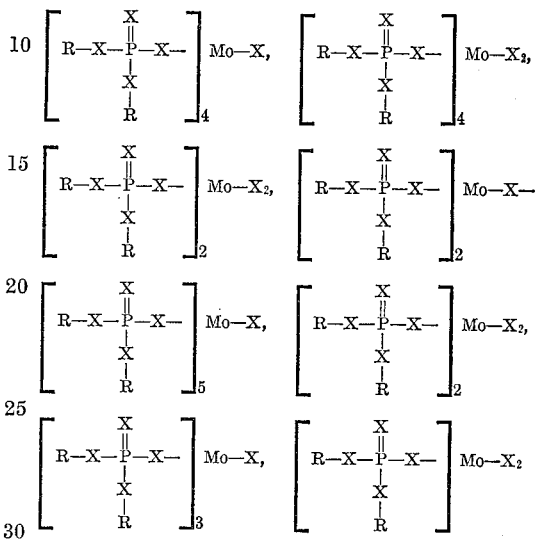

The radicals of the above formula may be substantially hydrocarbon radicals. They may be alkyl, aryl, alkaryl, cycloalkyl, or aralkyl radicals as well as hydrocarbon radicals containing polar substituents such as chloro, bromo, nitro, ether, mercapto, amino, keto, or, iodo radicals.

Specific examples of the R radicals include methyl, ethyl, isopropyl, isobutyl, n-butyl, sec-butyl, n-hexyl, heptyl, 2-ethylhexyl, diisobutyl, isooctyl, behenyl, decyl, dodecyl, octadecyl, eiconyl, butylphenyl, o,p-dipentylphenyl, octylphenyl, polyisobutene (molecular weight of 300-substituted phenyl, polypropen (molecular weight of 5000)-substituted phenyl, alpha-octyl-beta-naphthyl, beta-cyclohexyl-alpha-naphthyl, cyclopentyl, tetradecyl, cyclohexyl, phenyl, naphthenyl, 2-methyl cyclohexyl, benzyl, chloropentyl, dichlorophenyl, nitrophenyl, bromophenyl, dichlorodecyl, and xenyl radicals. The alkyl radicals having from about 3 to about 30 carbon atoms are especially desirable.

Methods for preparing the di-esterified phosphoric acids and their thio-analogues are known in the art. To illustrate, the O,O'-diesterified phosphorodithioic acids, i.e., those having the structural formula

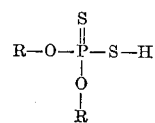

can be prepared by the reaction of phosphorus pentasulfide with an alcohol or phenol. The reaction involves four moles of the alcohol or phenol per mols of phosphorus pentasulfide and may be carried out within the temperature range from about 50° C. to 200° C. Thus, the preparation of O,O'-di-n-hexyl phosphorodithioic acid involves the reaction of phosphorus pentasulfide with four moles of n-hexyl alcohol at about 100° C. for about 2 hours. Hydrogen sulfide is liberated and the residue is the defined acid. Treatment of the phosphorodithioic acid with water or steam removes one or both sulfur atoms and converts the product to the corresponding phosphoromonothioic acid or phosphoric acid. Such acids are represented by the following structural formulas:

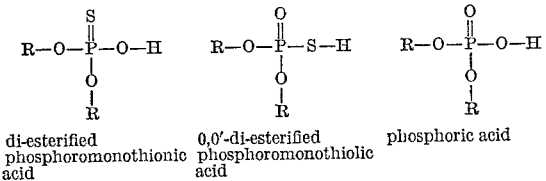

di-esterified phosphoromonothionic acid    O,O'-di-esterified phosphoromonothiolic acid    phosphoric acid Other thio-phosphoric acids from which the phosphoryl groups of the molybdenum salts may be derived include those having the structural formulas

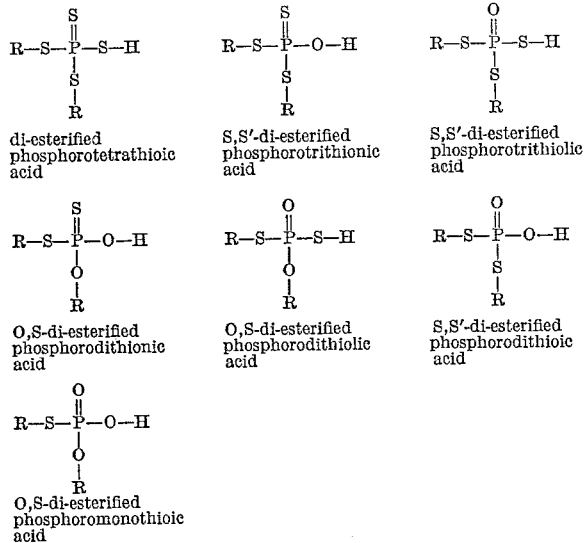

di-esterified phosphorotetrathioic acid    S,S'-di-esterified phosphorotrithionic acid    S,S'-di-esterified phosphorotrithiolic acid O,S-di-esterified phosphorodithionic acid    O,S-di-esterified phosphorodithiolic acid    S,S'-di-esterified phosphorodithioic acid O,S-di-esterified phosphoromonothioic acid The phosphortetrathioic acids can be prepared by the reaction of a mercaptan or thiophenol with $PSCl_3$ or $PSBr_3$ to produce either a phosphorotrithioic halids intermediate or tri-ester of phosphorotetrathioic acid intermediate and the subsequent reaction of the intermediate with hydrogen sulfide or soduim hydrosulfide. The phosphorotrithioic acids are obtained by the treatment of the phosphorotetrathioic acids with water or steam.

A convenient method for preparing the molybdenum salts of this invention comprises the reaction of an alkali metal (e.g., sodium or potassium) salt of the phosphorus acid with an alkali metal molybdate or ammonium molybdate. In most instances, the reaction is exothermic and takes place simply upon mixing the reactants at ordinary temperatures such as room temperature. The product can be recovered from the reaction mixture by acidifying the mixture with, e.g., hydrochloric acid, acetic acid, or sulfuric acid. The reaction is preferably carried out in the presence of a solvent such as benzene, naphtha, mineral oil, carbon tetrachloride, chloroform, acetone, ether, or nitrobenzene.

An alternative method involves the direct reaction of the organic phosphorus acid with an alkali metal molybdate or thiomolybdate. Such a reaction likewise can be carried out at ordinary temperatures such as room temperature. Another method involves the reaction of the organic phosphorus acid with a suitably molybdenum sulfide or oxide such as trisulfide, trioxide, dioxide, tertasulfide, or sesquisulfide, etc. This reaction appears to be promoted by water or a lower alcohol such as methanol or ethanol. The temperature at which the reaction is carried out usually ranges from about room temperature to 100° C. It will be noted that the product of the processes illustrated above may be either the tetraphosphoryl-substituted molybdenum oxide or sulfide depending on whether the molybdenum reactant used is a molybdenum oxide or sulfide, or is molybdate or thiomolybdate. The product may be a mixture of mono-, or di-, or tri-oxide or sulfides of the molybdenum salts of the phosphorus acids.

The following examples are illustrative of the processes for preparing the molybdenum salts of this invention:

EXAMPLE 1

A sodium O,O-di(4-methyl-1,2-pentyl)phosphorodithioate is prepared by mixing a 50% aqueous sodium hydroxide with O,O-di(4-methyl-2-pentyl)phosphorodithioic acid (prepared by the reaction of 4 moles of 4-methyl-2-pentyl alcohol with phosphorus pentasulfide). To the aqueous mixture containing the sodium phosphorodithioate there is added an aqueous solution of sodium molybdate dihydrate (1 molar proportion per 4 molar proportions of the sodium phosphorodithioate) at room temperature in 5 minutes. An exothermic reaction occurs. There is then added 37% hydrochloric acid at 25°–30° C. until the mixture is acidic and an organic layer separates. The organic layer is washed twice with cold water and mixed with a mineral oil. The oil solution is dried by heating to 80°–85° C./15–20 mm., then filtered. The filtrate, a 57% mineral oil solution of the phosphoryl-substituted molybdenum oxide, is found to have a phosphorus content of 5.4%, a sulfur content of 11.9%, and a molybdenum content of 4%. (The theoretical molybdenum content of tetra-(O,O'-di(4 - methyl - 2 - pentyl)phosphorodithioic) molybdenum oxide is 3.96%.)

EXAMPLE 2

A solution of 121 grams (0.5 mole) of sodium molybdate hydrate in 300 grams of water is added at 25°–35° C. in 0.3 hour to 670 grams (2 moles) of O,O'-di(4-methyl-2-pentyl)phosphorodithioic acid. The reaction mixture is mixed with 500 grams of naphtha and then acidified with 100 grams of 37% hydrochloric acid at 30°–35° C. The organic layer is washed with water and heated to 100° C./25 mm. to distill off naphtha and the residue filtered. The filtrate is the (O,O'-di(4-methyl-2-pentyl)phosphorodithioic)-substituted molybdenum oxide having a molybdenum content of 6.7%

EXAMPLE 3

To a refluxing mixture of 43 grams (0.25 mole) of molybdenum trioxide, 330 grams (1 mole) of O,O'-di(4-methyl-2-pentyl)phosphorodithioic acid, and 300 grams of benzene there is added to 200 grams of methyl alcohol dropwise within a period of 2 hours. The resulting mixture is heated at 66° C. for 2 hours and filtered. The filtrate is heated to 70° C./30 mm. to distill off the volatile components and the residue filtered. The filtrate is the (O,O'-di(4-methyl-2-pentyl)phosphorodithioic-substituted molybdenum oxide having a molybdenum content of 6.2%.

EXAMPLE 4

Sodium O,O'-di(4-methyl-2-pentyl)phosphorodithioate is prepared by mixing 210 grams (2.6 moles) of 50% aqueous sodium hydroxide with 820 grams (2.5 moles) of the phosphorodithioic acid at 18°–26° C. To this solution there is added at 260° C. 133 grams (0.11 mole) of an ammonium molybdate having the empirical formula of $(NH_4)_oMo_7O_{24}\cdot 4H_2O$ in 665 grams of water throughout a period of 10 minutes. The mixture is acidified with 215 grams of 20% aqueous acetic acid and agitated at room temperature for one hour. The product is extracted from the mixture with 6000 cc. of naphtha. The naphtha solution is washed with water and heated at 90°–95° C./20–25 mm. to distill off the solvent. The residue is the (O,O'-di(4 - methyl - 2 - pentyl)phosphorodithioic-substituted molybdenum oxide having a molybdenum content of 7.5%.

EXAMPLE 5

Sodium O,O-dinonylphosphorodithioate is prepared by mixing 80 grams (2 moles) of sodium hydroxide in 10 liters of water with 844 grams (2 moles) of O,O'-dinonylphosphorodithioic acid. To this mixture there is added 242 grams (1 mole) of sodium molybdate dihydrate in 1 liter of water in 30 minutes at 70°–80° C. The mixture is then acidified with 600 grams of 37% aqueous hydrochloric acid at 30°–35° C. and mixed with benzene. The benzene layer is washed with water, mixed with mineral oil, and heated to 105° C./25–30 mm. to distill off benzene. The residue is filtered. The filtrate is a 50% oil solution of the (O,O'-dinonylphosphorodithioic)-substituted molybdenum oxide having a phosphorus content of 7.3%, a sulfur content of 15.7%, and a molybdenum content of 5.5%.

EXAMPLE 6

A sodium phosphorodithioate is prepared by mixing 80 grams (2 moles) of a 50% aqueous sodium hydroxide with 840 grams (2 moles) of O,O'-di(2-ethyl-hexyl)phosphorodithioic acid at 35°–45° C. To this mixture there is added 120 grams (0.5 mole) of sodium molybdate dihydrate and 300 grams of water in 30 minutes at 40°–50° C. The mixture is then treated with 500 cc. of naphtha, 200 cc. of benzene, and acidified with 350 grams of 37% aqueous hydrochloric acid. The resulting mixture is heated at the reflux temperature for 1 hour, washed with water, and heated to 100° C./25 mm. to distill off the solvent. The residue is the tetra-(O,O'-di(2-ethyl-hexyl)phosphorodithioic)-substituted molybdenum oxide having a phosphorus content of 7.3%, a sulfur content of 15.4% and a molybdenum content of 4.9%.

EXAMPLE 7

A mixture of 404 grams (1 mole) of di(p-tert-pentylphenyl)phosphoric acid, 43 grams (0.25 mole) of molybdenum trioxide (86% purity), and 300 grams of benzene is heated to the reflux temperature (63°–87° C.). To the refluxing mixture there is added 200 grams of methyl alcohol in 3 hours. The resulting mixture is then filtered and the filtrate is heated to 90° C./30 mm. to distill off the solvents. The residue is the (O,O'-di(p-tert-pentylphenyl)phosphorodithioic)-substituted molybdenum oxide having a phosphorus content of 7.1% and a molybdenum content of 4.4%.

The molybdenum salts of the organic phosphorus acids of this invention are useful as emulsifying agents, detergents, plasticizers, paint driers, corrosion inhibiting agents, anti-foam agents, oxidation inhibiting agents, anti-wear agents, etc. Those which are soluble in hydrocarbon compositions are useful as additives in gasolines, fuel oils, lubricating oils and greases, and power transmitting fluids. In general, the molybdenum salts containing at least about 7.6 aliphatic carbon atoms per phosphorus atom are soluble in hydrocarbon oil compositions. For instance, they can be obtained from phosphorus acids which are prepared by the reaction of phosphorus pentasulfide with a mixture of alcohols in which a higher molecular weight alcohol (i.e., one having at least 5 aliphatic carbon atoms) and a lower molecular weight alcohol (i.e., one having less than 5 aliphatic carbon atoms) are present in proportions so as to result in a phosphorus acid characterized by at least about 7.6 aliphatic carbon atoms per phosphorus atom. Such acids are illustrated by the reaction product of phosphorus pentasulfide with a mixture consisting of 70 mole percent of cyclohexyl alcohol and 30 mole percent of isopropyl alcohol; a mixture of 80 mole percent of n-pentyl alcohol and 20 mole percent of n-butyl alcohol; and a mixture of 40 mole percent of octyl alcohol, 20 mole percent of decyl alcohol, and 40 mole percent of ethyl alcohol. The oil-soluble molybdenum salts likewise may be prepared from acid mixtures, i.e., mixtures of an acid characterized by having more than 7.6 aliphatic carbon atoms per phosphorus atom and an acid characterized by having less than 7.6 aliphatic carbon atoms per phosphorus atom. Such acid mixtures are exemplified by a mixture of 70 mole percent of O,O-dihexylphosphorodithioic acid and 30 mole percent of O,O'-dipropylphosphorodithioic acid. The foregoing acids and acid mixtures include those described in U.S. Patent No. 2,838,555.

The oil-soluble molybdenum salts of organic phosphorus acids of this invention are especially effective as additives in lubricating compositions to improve their anti-wear properties and oxidation- and corrosion-inhibiting properties. The lubricating oils which are benefitted by such additives may be of synthetic, animal, vegetable, or mineral origin. Ordinarily, mineral lubricating oils are preferred by reason of their availability, general excellence, and low cost. For certain applications, oils belonging to one of the other three groups may be preferred. For instance, synthetic polyester oils such as didodecyl adipate and di-2-ethyl hexyl sebacate are often preferred as jet engine lubricants. Normally the lubricating oils preferred will be fluid oils ranging in viscosity from about 40 Saybolt Universal Seconds at 100° F. to about 200 Saybolt Universal Seconds at 210° F. The concentrations of the molybdenum additives of this invention in the lubricating composition usually range between about 0.001% and about 10% by weight. More specifically, their concentrations usually range from about 0.01% to about 5% in a lubricating composition for internal combustion engines and from about 0.5% to about 10% in lubricating compositions for gears and power transmitting units.

The effectiveness of the additives of this invention as lubricant additives is shown by the results of a modified CRC L–4–545 engine test. (The modification consisting of extending the test period from 36 to 72 hours, thus making the test more severe). The test involves the operation of a 6-cylinder gasoline automobile engine under the following conditions: engine speed, 3150 r.p.m.; engine load, 30 brake horsepower; jacket coolant temperatures, outlet 200° F., inlet 190° F.; oil sump temperature 265° F.; air:fuel ratio, 14.5:1. The lubricant used in the engine is rated according to the weight loss of the bearing and the cleanliness of the pistons and the overall varnish and sludge deposits on the various parts of the engine. By this test a SAE 30 mineral lubricating oil containing 0.89% by weight of the O,O'-dinonylphosphorodithioic-substituted molybdenum oxide of Example 5 gives a piston cleanliness rating of 8 (10 being perfectly clean) and an overall varnish and sludge rating of 85.5 (100 being perfectly clean).

Other additives useful in lubricating compositions in conjunction with the molybdenum salts of this invention include detergents of both ashless and metal-containing types, supplemental oxidation- and corrosion-inhibiting agents and extreme-pressure agents, rust-inhibiting agents, pour point depressing agents, viscosity index improving agents, anti-foam agents, etc.

Detergents useful in conjunction with the phosphorous- and nitrogen-containing composition in lubricants include normal or basic salts of petroleum naphthenic acids, petroleum sulfonic acids, oil-soluble, fatty acids, etc.; and ashless detergents such as the neutralization product of triethylene tetramine with an alkenyl substituted succinic anhydride having 50 carbon atoms in the alkenyl substituent and the copolymer of 5 parts of beta-diethylaminoethyl acrylate with 95 parts of dodacyl methacrylate. Oxidation-inhibitors useful in such lubricants include, e.g., basic metal petroleum sulfonates, metal phenates, amines, benzyl thiocyanates, etc. Film strength agents include, e.g., chlorinated paraffin oils containing from 20 to 70% of chlorine, chlorinated eicosane wax containing from 50 to 60% of chlorine, hexachlorodiphenyl ether, polychlorobiphenyl, etc. Oiliness agents include, e.g., methyl oleate, oleic acid, stearic acid, sulfurized sperm oil, sperm oil, corn oil, etc. Four point depressors include, e.g., waxalkylated naphthalene or phenanthrene, copolymer of butyl methacrylate with decyl mothacrylate, etc. Foam inhibitors include, e.g., the polymeric di-alkylsilicone, poly acrylates, etc. Viscosity index improvers include, e.g., polymerized and copolymerized alkyl methacrylates, polymerized butenes, etc.

What is claimed is:

1. A lubricating composition comprising a major proportion of a mineral lubricating oil and about 0.001–10.0% by weight of a stable, oil-soluble molybdenum salt of a phosphorodithioic acid having the structural formula

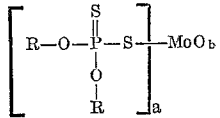

wherein R is an alkyl radical containing from 3 to about 30 carbon atoms, $a$ and $b$ are each an integer of at least 1, and $(a+2b)$ is the valence of molybdenum and is from 4 to 8, said phosphorodithioic acid containing at least about 7.6 carbon atoms per molecule.

2. A lubricating composition according to claim 1 wherein $a$ is 4 and $b$ is 1.

3. A lubricating composition according to either of claims 1 and 2 wherein R is the 4-methyl-2-pentyl radical.

References Cited

UNITED STATES PATENTS

| 2,560,542 | 7/1951 | Bartleson et al. | |
| 2,697,033 | 12/1954 | Ambrose et al. | 44—68 |
| 2,838,555 | 6/1958 | Goldsmith. | |
| 2,866,732 | 12/1958 | Hoff et. al. | |
| 3,065,065 | 11/1962 | Sutton et al. | 44—68 XR |
| 3,068,259 | 12/1962 | Hartle | 252—32.7 XR |
| 3,193,500 | 7/1965 | Hartle. | |

PATRICK P. GARVIN, *Primary Examiner.*

U.S. Cl. X.R.

44—68